United States Patent [19]

Hagmann et al.

[11] Patent Number: 5,200,121
[45] Date of Patent: Apr. 6, 1993

[54] METHOD FOR THE MANUFACTURE OF CONTACT LENSES

[75] Inventors: Peter Hagmann, Hösbach-Bahnhof; Peter Höfer, Aschaffenburg, both of Fed. Rep. of Germany

[73] Assignee: Ciba-Geigy Corporation, Ardsley, N.Y.

[21] Appl. No.: 689,400

[22] Filed: Apr. 22, 1991

[30] Foreign Application Priority Data

Apr. 24, 1990 [CH] Switzerland .................. 1376/90

[51] Int. Cl.$^5$ ............................................. B29D 11/00
[52] U.S. Cl. ...................................... 264/1.8; 264/1.4; 264/2.5; 264/297.1; 264/219; 219/121.69; 425/808
[58] Field of Search ............... 264/2.5, 2.7, 2.1, 2.2, 264/1.4, 1.8, 297.1, 219; 219/121.69; 425/808

[56] References Cited

U.S. PATENT DOCUMENTS

| | | | |
|---|---|---|---|
| 3,422,168 | 1/1969 | Bowser | 264/2.5 |
| 3,423,488 | 1/1969 | Bowser | 264/2.5 |
| 3,614,624 | 10/1971 | Scarpino | 325/163 |
| 3,822,089 | 7/1974 | Wichterle | 264/2.1 |
| 3,871,803 | 3/1975 | Beattle | 425/175 |
| 4,141,941 | 2/1979 | Travnicek | 264/2.6 |
| 4,254,065 | 3/1981 | Ratkowski | 264/2.5 |
| 4,279,401 | 7/1981 | Ramirez et al. | 264/2.5 |
| 4,455,893 | 6/1984 | Asterö | 76/107R |
| 4,522,768 | 6/1985 | Roscrow et al. | 264/2.2 |
| 4,614,624 | 9/1986 | Neefe | 264/2.5 |
| 4,681,295 | 7/1987 | Haardt et al. | 264/2.5 |
| 4,874,561 | 10/1989 | Spector | 264/2.2 |

FOREIGN PATENT DOCUMENTS 359539  3/1990  European Pat. Off. .............. 264/2.1

Primary Examiner—Jan H. Silbaugh
Assistant Examiner—Mathieu Vargot
Attorney, Agent, or Firm—Edward McC. Roberts; William G. Hervey

[57] ABSTRACT

In the process described, a limited number of shaping tools ($T_1, T_2, \ldots, T_N$) having standardized parameters (for the production of the following contact lens parameters: contact lens diameter, radius of curvature of the rear face of the contact lens, vertex refraction) is used for the manufacture of standardized moulds ($M_1, M_2, \ldots, M_N$). Preferably by material-removing machining of the moulds, moulds are produced that have additional altered parameters. The multiplicity of moulds produced in that manner is used for the one-step manufacture (F) of contact lenses (L) having different parameters that largely do not have to be finished.

20 Claims, 2 Drawing Sheets

METHOD FOR THE MANUFACTURE OF CONTACT LENSES

BACKGROUND OF THE INVENTION

The invention relates to a method for the manufacture of contact lenses, especially a method for the one-step manufacture of contact lenses that largely do not have to be finished, by direct polymerization of a polymerization batch in a mould, according to the pre-characterising clause of patent claim 1. "Polymerization batch" is to be understood hereinafter as meaning, quite generally, polymerizable monomers, polymerizable oligomers, polymerizable prepolymers or polymerizable mixtures thereof.

Recently, many attempts have been made to manufacture contact lenses in a so-called one-step shaping process by direct polymerization of a polymerization batch in a mould. In contrast to the original methods of manufacture in which the front and/or the rear face of the contact lens are/is produced on a contact lens button by removing material, in this one-step method the front face and the rear face of the contact lens are determined only by the corresponding shaping faces of the mould. The aim of this so-called one-step method is to manufacture contact lenses that largely do not have to be finished, by direct polymerization of a polymerization batch inside the mould. Usually the moulds are made of plastics and are in the form of disposable moulds. Each mould is accordingly used for the manufacture of only a single contact lens. Methods of manufacture that use a separate disposable mould for each lens to be produced are described, for example, in FR-A-1,462,519 or in U.S. Patent Specifications U.S. Pat. No. 3,871,803, U.S. Pat. No. 3,614,624 and U.S. Pat. No. 4,455,893. Finally, in the method described in U.S. Pat. No. 4,254,065, so-called "raw buttons" are manufactured by injection-moulding in moulding tools. The production of the actual customer-specific lenses is effected by finishing the prefabricated raw buttons by removing material.

A large number of preparatory operations precede the actual process of manufacturing the contact lens. For example, shaping tools for the manufacture of the moulds are produced in accordance with the desired parameters of the later contact lens, such as, for example, lens diameter, curvature of the rear face and focal power of the lens. Those shaping tools, which are normally produced from metal, are then fitted in so-called mould plates which are in turn inserted into an injection-moulding tool. Each shaping tool is thus used for the manufacture of some ten thousand disposable plastics moulds before it is rendered unusable by the great mechanical stresses of that injection-moulding process and the stringent accuracy requirements. Each of the disposable moulds produced in that manner is then used for the manufacture of a single contact lens. After any necessary after-treatment of the contact lens, for example a tinting of the contact lens or a hydration of so-called soft contact lens material, which preferably takes place in the associated mould, the contact lens is advantageously packed, still in its associated mould (half), and stored or despatched. The totality of all those process steps is referred to as full-mould technology. The individual process steps are given again below in summary:

(1) Manufacture of the shaping tools
(2) Fitting of the shaping tools in mould plates
(3) Insertion of the mould plates into an injection-moulding tool
(4) Injection-moulding of the disposable plastics moulds
(5) Manufacture of the contact lens by direct polymerization of the polymerization batch in the disposable mould
(6) After-treatment of the contact lens if necessary
(7) Packing of the contact lens in disposable mould Full-mould technology has proved to be especially advantageous and economical in particular for the production of soft contact lenses, for example those which contain poly-2-hydroxyethyl methacrylate (P-HEMA) or copolymers of that compound. Soft contact lenses are manufactured in relatively large production runs. In particular, however, owing to their very good fitting properties in respect of the shape of the eye, especially the geometric nature of the cornea, a relatively small number of sets of parameters (for example lens diameter and curvature of the rear face of the lens) is sufficient to cover a wide range of fittings in cases of sight defects. Full-mould technology has therefore been successful especially for the manufacture of soft contact lenses since the costs and time required for the preparatory operations listed under process steps (1) to (4) prove to be proportionately very low owing to the relatively small number of different shaping tools required and the large contact lens production runs per shaping tool.

A second large group of contact lenses is the so-called hard contact lenses and the so-called hard/flexible contact lenses. For example, contact lenses made of polymethyl methacrylate (PMMA) are referred to as hard contact lenses; hard/flexible or Rigid Gas-Permeable (RGP) contact lenses are preferably manufactured from materials having a high degree of oxygen permeability, for example from fluorine- and/or silicone-containing polymers. Owing to the relatively high degree of rigidity of those materials, hard and hard/flexible contact lenses fit the geometry of the cornea of the eye to only a limited extent. However, in order to make those contact lenses too as comfortable as possible to wear, without irritation to the eye and without pressure, while achieving optimum optical correction of the sight defect, in particular the curvature of the rear face of the lens and its diameter are matched as accurately as possible to the surface shape and curvature of the cornea and to the diameter of the pupil of the eye of the contact lens wearer. Together with the multiplicity of different focal powers required for the contact lenses, there result a large number of different contact lenses having up to 4000 or more different parameter values in respect of the contact lens diameter, the curvature of the rear face of the contact lens—the face that rests on the cornea—and the focal power of the contact lens. Only very small production runs, however, result therefrom for the individual combinations of parameters. For that reason, hard and hard/flexible contact lenses have hitherto been manufactured mainly by material-removing shaping from lens buttons. The fluorine- and/or silicone-containing polymers particularly are, however, often difficult to machine by cutting processes, which markedly increases the manufacturing time and the manufacturing costs of such lenses. In addition, the contact lens is relatively awkward to handle when it is being machined. Care must particularly be taken that the already produced front or rear face of the contact lens is not damaged when the second lens face is machined. Furthermore, during machine-cutting, stresses often also occur in the contact lens material which can sometimes lead even to the destruction of the contact lens.

There is accordingly a desire to provide a method for the manufacture of contact lenses that permits an economical use of full-mould technology even in the case of types of contact lens that are manufactured in numerous different parameters and accordingly in small production runs. In addition, the method is also to permit a simple, rapid and inexpensive manufacture of contact lenses from contact lens materials that are difficult or impossible to machine by cutting. The above-mentioned disadvantages that often occur when the contact lenses are machined are also to be largely avoided.

BRIEF DESCRIPTION OF THE DRAWINGS

The method according to the invention is explained in detail below with reference to the drawings.

DETAILED DESCRIPTION OF THE INVENTION

Figure 1:
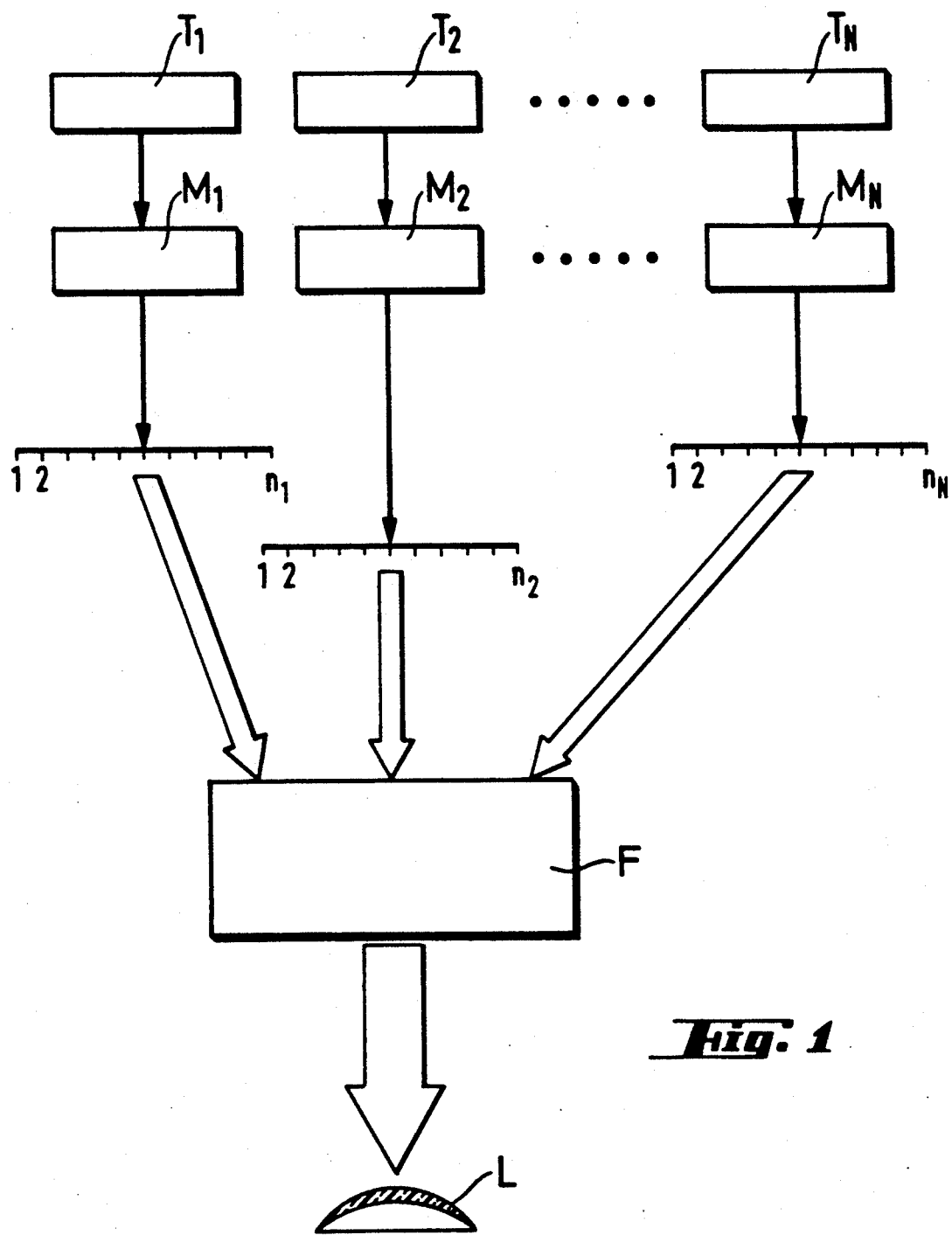
FIG. 1 is a general diagram of the production of the multiplicity of moulds.

The method according to the invention shown in FIG. 1 in a general diagrammatic view proceeds in a manner similar to the method of manufacture known for soft contact lenses. Here too, shaping tools $T_1, T_2, \ldots, T_N$ are first prepared and then fitted in mould plates and the mould plates are then inserted into an injection-moulding device. In the injection-moulding process, disposable moulds $M_1, M_2, \ldots, M_N$ are then manufactured which are used for the actual shaping process F for the contact lenses L.

Unlike the known full-mould technology, however, the shaping tools $T_1, T_2, \ldots, T_N$ are manufactured only in a limited number with few standardized parameters. For example, shaping tools $T_1, T_2, \ldots, T_N$ are manufactured with twenty different radii of curvature for the rear face of the contact lens and for only two different lens diameters. The front face of the contact lens is standardized and has the same radius of curvature for all lens types and lens diameters. By combining the parameters of lens diameters and radii of curvature, forty different disposable moulds $M_1, M_2, \ldots, M_N$ can thus be manufactured in the injection-moulding process. Those forty different disposable moulds include twenty male parts 1 having twenty different radii of curvature for the shaping face 3 for the rear side of the contact lens and twenty female parts 2 having a uniform radius of curvature for the second shaping face 4 for the front side of the contact lens, in two different diameters in each case.

Figure 2:
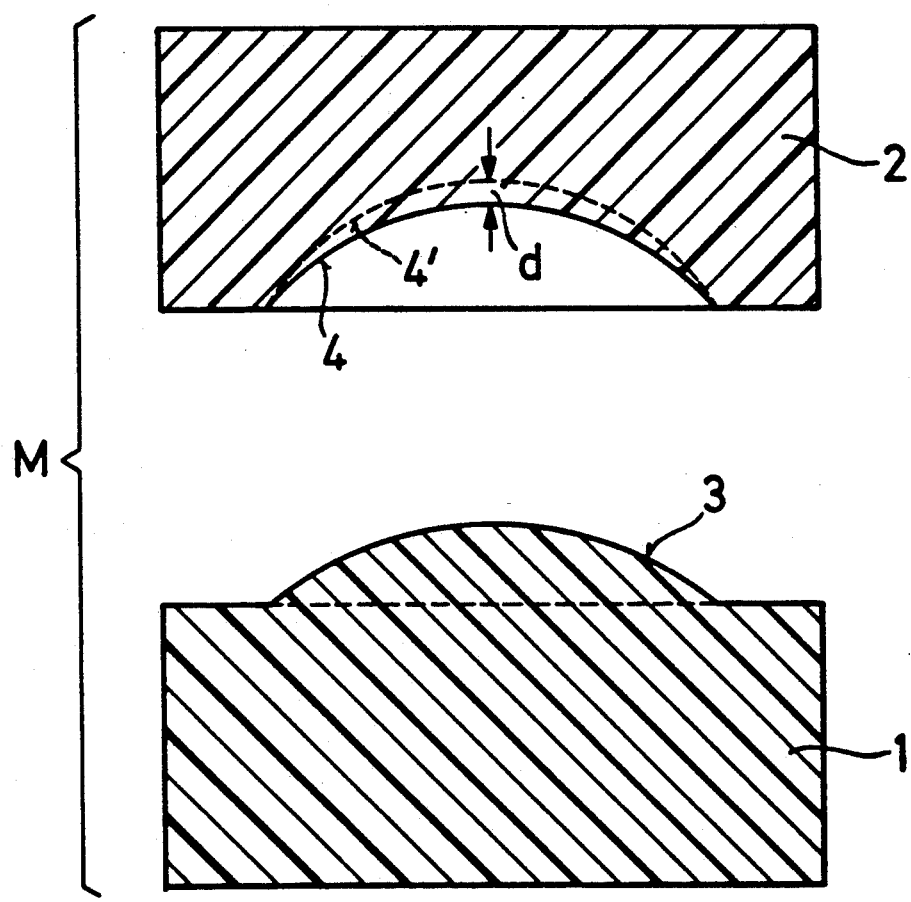
FIG. 2 is a diagram of an example of a standard mould indicating a modified shaping face in axial section.

In order nevertheless to be able to manufacture lenses having the required multiplicity of parameters using the limited number of standardized moulds M, the latter are modified in a further process step as predetermined. For that purpose the standardized shaping face 4 of the female part 2 for the front face of the contact lens is preferably further machined. For example, the radius of curvature of the shaping face 4 is reduced by material-removing machining as indicated in FIG. 2 by the broken line 4'. The focal power of the contact lens produced later can thus be predetermined in a specific manner. The material-removing machining can be carried out by the established turning technique involving cutting, which, for the mould materials conventionally used, such as, for example, polypropylene or polymethyl methacrylate, has achieved a high degree of maturity. The use of computer-controlled lathes also permits a high degree of automation of that known turning technique.

In an especially preferred manner, however, material is removed by laser machining. The Excimer lasers preferably used enable material to be removed as carefully as possible with no stressing of the mould material occurring. The particular advantage of laser machining the mould is, however, that the laser beam can be readily deflected, preferably under computer control. The radii of curvature can thus be changed almost continuously and even complicated geometries can be readily produced, for example aspherical, aplanatic, bifocal, multifocal or toroidal contact lenses and also so-called binary optics. Owing to the especially easy control of the deflection of the laser beam, which control can be altered very rapidly, material-removing laser machining of the moulds M is very especially suitable for so-called CAE/CAM systems, CAE standing for Computer Aided Engineering and CAM standing for Computer Aided Manufacturing. In the case of such production systems, the desired modified contour of the standardized mould M is produced with the aid of the computer and the data are conveyed directly from the computer to the control system of the laser machining device. In cases where the "modelling" and control computers are separate, the control data transfer can also be effected by way of an interpolated storage medium (data tape, diskette, fixed disc etc.).

In that manner, for example, one hundred different modified female parts 2 are produced to the forty standardized male parts 1 (two different diameters and twenty different curvatures of the shaping faces 3 for the rear face of the contact lens), the female part belonging to the mould $M_1$ being modified $n_1$-fold, the female part belonging to the mould $M_2$ being modified $n_2$-fold, etc. and the female part belonging to the mould $M_N$ being modified $n_N$-fold. Overall, a great multiplicity of moulds is thereby obtained with, for example, 4000 different parameters (diameter, radius of curvature of the shaping face for the rear face of the contact lens and radius of curvature of the shaping face for the front face of the contact lens and focal power).

With that large number of different moulds M, the actual shaping step F of the contact lens manufacturing procedure is then carried out. Each of the moulds is filled with a polymerization batch, the male part 1 and the female part 2 are joined together, either being pressed together by external closing means or adhering to one another by the interference fitting of the mould halves 1 and 2. The polymerization batch is polymerized directly in the moulds M which for that purpose are arranged inside a polymerization device. Polymerization is carried out in known manner using X-ray, ultraviolet, infrared or microwave radiation or some other suitable high-energy radiation.

After polymerization, the moulds M are opened and the contact lenses L are further processed if necessary, for example tinted or hydrated. The finished contact lenses L are then packed preferably in one of the associated mould halves 1 or 2 and prepared for despatch or storage.

The material-removing machining of the moulds $M_1, M_2, \ldots, M_N$ is not, of course, limited only to the machining of the standardized female part 2. If necessary, the shaping face 3 on the male part 1 for the rear face of the contact lens can also be further machined. For example, an aspherical edge region can thus be made adjacent to a spherical central region of the shaping face. It is also possible to manufacture various female parts 2 in the injection-moulding process, with different radii of curvature for the shaping face 4 for the front face of the contact lens, while only a single or only a few male parts 1 are produced with standardized shaping faces 3 for the rear face of the contact lens. The production of the further multiplicity of moulds having many different parameters (curvatures, refractive indices) is then effected, for example, by machining the male part 1 alone or by machining both mould halves 1 and 2. Since, however, a slight degree of roughness sometimes still occurs after one of the mould halves has been machined and a polishing step may still be necessary, preferably only the standardized female part 2 having the shaping face 4 for the front face of the contact lens is machined, while the various male parts 1 having the shaping face 2 for the rear face of the contact lens are manufactured in the injection-moulding process.

In the region of the shaping faces 2 and 4, the moulds M manufactured in the injection-moulding process have wall thicknesses of from approximately 0.5 mm to approximately 5 mm, preferably approximately 1.5 mm. The maximum removal d of material in the subsequent machining step is from approximately 0.05 mm to approximately 1.0 mm.

The shaping tools $T_1, T_2, \ldots, T_N$, which are preferably produced from metal, are designed for only a few standardized parameters. For example, the shaping tool for the rear face of the contact lens is manufactured preferably with only a few standardized parameters, for example for the customary diameters of from approximately 8.5 mm to approximately 15.0 mm. The radii of curvature for the various rear faces are selected to be from approximately 7.2 mm to approximately 8.6 mm, for example in graduations of approximately, 0.05 mm or 0.1 mm. The shaping tool for the front face of the contact lens is accordingly intended for only two contact lens diameters and a single radius of curvature for the front face of the contact lens. The production of other radii of curvature and therefore of moulds for lenses having a different focal power is of course preferably effected by material-removing machining of the corresponding female part. In particular, the shaping tools $T_1, T_2, \ldots, T_N$ are to be designed for radii of curvature of the front face of the contact lens that correspond to vertex refractions of the contact lenses to be manufactured of from +25.00 dpt to −25.00 dpt.

Instead of the material-removing machining processes discussed hitherto, material-applying additive processes can naturally also be used to increase the multiplicity of parameters.

In all, the method according to the invention permits the economical use of simple full-mould technology even for types of contact lens that are required only in small quantities. By the specifically controlled modification of parameters by machining already finished injection-moulded standard moulds, the number of expensive shaping tools, the production of which is complicated, is markedly diminished and reduced to only certain standard forms. The necessary multiplicity of moulds is produced by subsequent machining of the injection-moulded standard moulds as required. By machining the moulds, all the disadvantages entailed in direct machining of the contact lens buttons are avoided. Only the relatively cheap plastics moulds are machined and only perfect moulds are used further. If the desired mould machining is unsuccessful, only the particular mould concerned is discarded. The moulds are easy to handle and, being in a suitable form, permit simple adjustment and holding during machining. In addition, the moulds can also be provided with special protective cylinders or the like for the shaping faces, which enables prefabricated injection-moulded moulds to be stored easily and without being damaged. The method is designed for a high degree of automation capability and, in particular, permits simple integration in CAE/CAM systems.

What is claimed is:

1. In a method for the manufacture of contact lenses,
   (a) shaping tools are manufactured,
   (b) said shaping tools are fitted in mould plates,
   (c) said mould plates are inserted into an injection moulding tool,
   (d) using said shaping tools, a plurality of disposable moulds are manufactured by injection moulding each of said moulds comprising a male mould-half having a shaping face for a rear face of a contact lens and a female mould-half having a shaping face for a front face of said contact lens, and
   (e) said contact lenses are manufactured by direct polymerization of a polymerization batch in said disposable moulds, the improvement wherein only a limited number of shaping tools are provided for said injection moulding of said plurality of said moulds, a thus obtained limited number of standardized disposable moulds being shaped for the production of only a limited variety of contact lenses having different standardized diameters, standardized radii of curvature of the rear faces and standardized focal powers;
   and wherein said standardized moulds are further finished subsequently, thus increasing the variety of said injection moulded disposable molds for said manufacture of contact lenses having desired diameters, desired radii of curvature of the rear faces, and required focal powers.

2. A method according to claim 1, wherein said shaping tools are manufactured for customary contact lens diameters of from approximately 8.5 mm to approximately 15.0 mm.

3. A method according to claim 1, wherein said shaping tools are produced for a radius of curvature of said rear face of said contact lens of from approximately 7.2 mm to approximately 8.6 mm.

4. A method according to claim 3, wherein said radii of curvature on said various shaping tools are graduated in approximately 0.05 mm or in 0.1 mm steps.

5. A method according to claim 1, wherein said shaping tools ar designed for radii of curvature of said front face of said contact lens that correspond to vertex refractions of said contact lenses to be manufactured of from +25.00 dpt to −25.00 dpt.

6. A method according to claim 1, wherein said shaping tools are designed for only a fixed radius of curvature of said front face of said contact lens.

7. A method according to claim 1, and further comprising the step of finishing the shaping face of at least one of said female mould-half and said male mould-half.

8. A method according to claim 7, wherein said finishing is effected by material-removing machining.

9. A method according to claim 1, wherein, in a region of their shaping faces, said female mould-half and said male mould-half are manufactured with wall thicknesses of from approximately 0.5 mm to approximately 5.0 mm.

10. A method according to claim 9, wherein said shaping face for said front face of said contact lens is altered at said female mould-half by material-removing machining.

11. A method according to claim 10, wherein said removal of material is at maximum from approximately 0.05 mm to approximately 1.0 mm.

12. A method according to claim 8, wherein said material-removing machining is effected by machine-cutting said mould halves using turning technique.

13. A method according to 12, wherein said machine-cutting is computer-controlled.

14. A method according to claim 8, wherein said material-removing machining is effected by laser machining.

15. A method according to claim 14, wherein an Excimer laser is used.

16. A method according to claim 15, wherein a beam deflection of said laser is computer-controlled.

17. A method according to claim 1, wherein said moulds are modified for a manufacture of aspherical, aplanatic, bifocal, multifocal or toroidal lenses.

18. A method according to claim 1, wherein said shaping tools are manufactured from metal.

19. A method according to claim 1, wherein said standardized disposable moulds are produced from plastic.

20. A method according to claim 9, wherein the wall thicknesses are about 1.5 mm.

* * * * *